US008594442B2

United States Patent
He

(10) Patent No.: US 8,594,442 B2
(45) Date of Patent: Nov. 26, 2013

(54) METHOD AND DEVICE FOR PERFORMING IMAGE COMPRESSION CODING

(71) Applicant: Tencent Technology (Shenzhen) Company Limited, Shenzhen (CN)

(72) Inventor: Jian He, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 0 days.

(21) Appl. No.: 13/644,230

(22) Filed: Oct. 3, 2012

(65) Prior Publication Data

US 2013/0028532 A1 Jan. 31, 2013

Related U.S. Application Data

(63) Continuation of application No. PCT/CN2011/072720, filed on Apr. 13, 2011.

(30) Foreign Application Priority Data

Apr. 21, 2010 (CN) .......................... 2010 1 0152912

(51) Int. Cl.
 *G06K 9/36* (2006.01)
 *G06K 9/46* (2006.01)

(52) U.S. Cl.
 USPC .......................................... 382/233; 382/251

(58) Field of Classification Search
 USPC ......... 382/164, 166, 173, 232, 233, 239, 250, 382/251; 348/409.1; 375/240.11, E7.033, 375/E7.093; 358/1.15, 1.9; 386/46, 111
 See application file for complete search history.

(56) References Cited

U.S. PATENT DOCUMENTS

| 5,253,078 | A | * | 10/1993 | Balkanski et al. | ............ 382/250 |
| 5,808,683 | A | * | 9/1998 | Tong et al. | ............... 375/240.11 |
| 2003/0012431 | A1 | * | 1/2003 | Irvine et al. | ................... 382/166 |
| 2003/0053115 | A1 | * | 3/2003 | Shoda et al. | ................. 358/1.15 |
| 2004/0076399 | A1 | * | 4/2004 | Arai et al. | ........................ 386/46 |
| 2013/0028532 | A1 | * | 1/2013 | He | ............................... 382/233 |

FOREIGN PATENT DOCUMENTS

| CN | 1509071 A | 6/2004 |
| CN | 1678075 A | 10/2005 |
| CN | 1909589 A | 2/2007 |

OTHER PUBLICATIONS

International Search Report: mailed Jul. 21, 2011; PCT/CN2011/072720.

* cited by examiner

*Primary Examiner* — Amir Alavi

(74) *Attorney, Agent, or Firm* — Ladas & Parry LLP

(57) ABSTRACT

Examples of the present invention provide a method and device for image compression coding. The method includes: obtaining a designated area selected from an image at a decoding side; determining quantization coefficients of the image to make an image compression ratio of the designated area lower than image compression ratios of areas in the image other than the designated area; and performing a compression coding on the image using the determined quantization coefficients of the image. By using the present invention, a video communication system may support a user to select an interested area in a video image, and clearly transmit the interested area selected by the user.

19 Claims, 3 Drawing Sheets

300

400

METHOD AND DEVICE FOR PERFORMING IMAGE COMPRESSION CODING

This application is a continuation of PCT/CN2011/072720 filed on Apr. 13, 2011.

FIELD OF THE INVENTION

The present invention relates to image processing technique, and particularly to a method and device for image compression coding.

BACKGROUND OF THE INVENTION

With popularity of Instant Messaging and upgrading of network bandwidth of Internet, more and more users start using a camera for video chat. However, due to limitations of bandwidth and network quality of a current Internet Protocol (IP) network, data amount of each frame of video transmitted in the IP network is limited; therefore, it is required to perform data compression coding on video images transmitted over the IP network.

In prior art, when data compression coding is performed on a video image, the data amount of each frame is distributed evenly in the entire frame image to ensure the overall image quality, while it does not concern about whether a certain area in a frame image needs more code stream to be distributed or not.

In the process of achieving the present invention, the inventors found that the above-mentioned method for video image compression coding in prior art has following disadvantages: after a compression coding is performed on a video image and the compressed video image is transmitted over an IP network, the overall image quality is inevitably declined, so that details of the image could not be seen clearly by a user of a receiving side.

SUMMARY OF THE INVENTION

Examples of the present invention provide a method for image compression coding including: obtaining a designated area selected from an image at a decoding side; determining quantization coefficients of the image to make an image compression ratio of the designated area lower than image compression ratios of areas in the image other than the designated area; and performing a compression coding on the image using the determined quantization coefficients of the image.

An example of the present invention also provides a device for image compression coding including: a quantization coefficient determining module, to obtain a designated area selected from an image at a decoding side, determine quantization coefficients of the image to make an image compression ratio of the designated area lower than image compression ratios of areas in the image other than the designated area; and a compression coding processing module, to perform a compression coding on the image using the determined quantization coefficients of the image.

An example of the present invention also provides a non-transitory computer readable storage medium storing one or more programs, the one or more programs including instructions that when executed by one or more computers cause the one or more computers to perform operations including: obtaining a designated area selected from an image at a decoding side; determining quantization coefficients of the image to make an image compression ratio of the designated area lower than image compression ratios of areas in the image other than the designated area; and performing a compression coding on the image using the determined quantization coefficients of the image.

DETAILED DESCRIPTION OF THE INVENTION

To make the objective and advantages of the present invention more clearly, the present invention is explained in detail as follows with reference to drawings and examples.

A First Example

Figure 1:
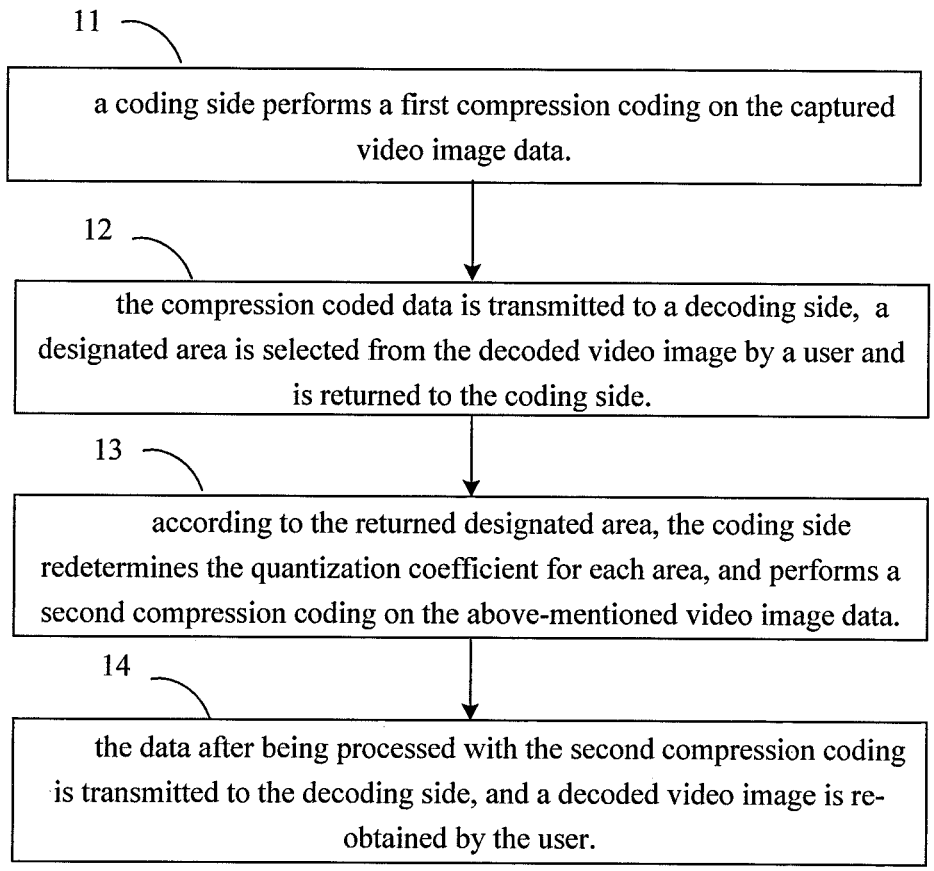
FIG. 1 is a flowchart illustrating a method for image compression coding according to a first example of the present invention.

A process of a method for image compression coding provided by the example is shown in FIG. 1, which includes the following steps.

Step 11, a coding side performs a first compression coding on the captured video image data.

Here, the coding side captures video image data to be transmitted, and performs the first compression coding on the video image data; this first compression coding at least includes technical means such as inter-frame coding processing and intra-frame coding processing.

Video image data has a strong correlation, which means that there exists a lot of redundant information. The redundant information may be classified into spatial domain redundant information and time domain redundant information. The above-mentioned compression coding is to remove the redundant information from the data, namely, to remove the correlation among the data.

Figure 2:
FIG. 2 is a schematic diagram illustrating a video image captured by a coding side according to a first example of the present invention.

The above-mentioned process of video image data compression coding is performed frame by frame, which takes the frame as a unit. For example, a video image captured by the coding side is shown in FIG. 2, the compression coding is performed to each frame image in the video sequence shown in FIG. 2 in turn. Here, a frame image may also be referred as a frame. When the compression coding is performed to one of the frame images, firstly, the time domain redundant information is removed from the frame image using the inter-frame coding processing method to obtain motion information of each area in the frame image. The above-mentioned inter-frame coding processing method mainly includes any one or any combination of motion compensation, motion expression and motion estimation. Then, the spatial domain redundant information is removed from the frame image using the intra-frame coding processing method. The process of removing the spatial domain redundant information includes transform coding and quantization coding. Firstly, spatial domain signals in the frame image are transformed into another orthogonal vector space using the transform coding, so that the correlation of the frame image is declined and data redundancy is reduced. After the transform coding is performed to the spatial domain signals in the frame image, a transform coefficient of each area in the frame image is obtained.

In this example, it is required to predetermine a quantization coefficient for each area in each frame image within the above-mentioned video image. Here, areas in each frame image may be divided in accordance with macro blocks of each frame image, at this time, each macro block represents an area, where an area in a frame image may also be called as an image block, which may be a block with various pixel size (such as a 32*32 pixel block, a 16*16 pixel block, a 8*8 pixel block, a 32*16 pixel block, a 16*32 pixel block, a 16*8 pixel block or a 8*16 pixel block). The transform coefficient of an area in one of the frame images is quantized using the quantization coefficient of this area. The quantization coefficient of an area determines a compression ratio of data amount of the image of the area, and the compression ratio of the area positively correlates to the quantization coefficient of the area, and the compression ratio corresponds to the display quality of the decoded image of the area. The smaller the compression ratio is, the greater the data amount of the image of the area is, and the higher the display quality of the decoded image of the area is.

Finally, an entropy coding is performed to the motion information obtained by the above-mentioned inter-frame coding processing and the quantized transform coefficients obtained by the above-mentioned intra-frame coding processing to obtain the compression coded data of the above frame image. The above entropy coding is lossless coding, and is adapted to further compress the above-mentioned motion information and quantized transform coefficients.

The coding side needs to save the motion information obtained by coding each frame image, and save the quantization coefficient of each area in each frame image.

Step 12, the compression coded data is transmitted to a decoding side, and a video image decoded by the decoding side is obtained, a designated area is selected from the video image and is returned to the coding side.

Figure 3:
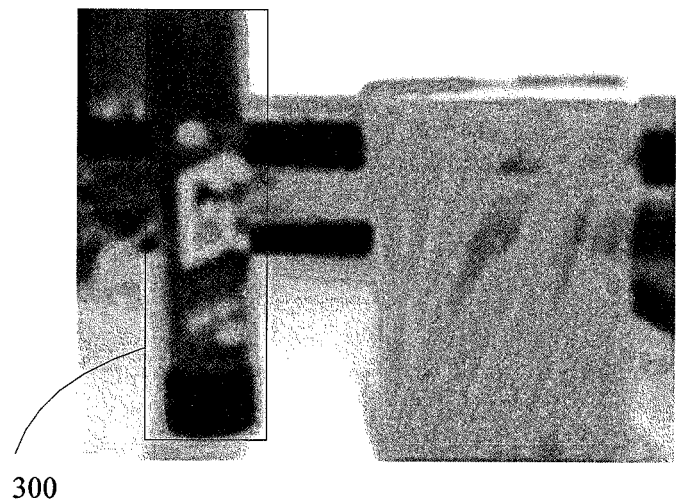
FIG. 3 is a schematic diagram illustrating a video image obtained by a decoding side after a video image shown in FIG. 2 is coded for the first time according to the first example of the present invention.

According to an order of serial numbers of frame images, the compression coded data of each frame image within the above-mentioned video image shown in FIG. 2 is transmitted to the decoding side in turn; the decoding side decodes the received data, and outputs the decoded data to a video display module for displaying, and then a video image shown in FIG. 3 is obtained.

After watching the video image shown in FIG. 3 through the video display module, a user selects a designated area from the video image shown in FIG. 3 through the video display module, and then returns the selected designated area to the coding side. For example, the designated area selected by the user from the video image shown in FIG. 3 is area 300 which is surrounded by a box and accompanied with a trademark of "Pritt".

Step 13, according to the designated area returned by the decoding side, the coding side redetermines the quantization coefficient for each area in each frame image within the video image, and performs a second compression coding on the above-mentioned video image data.

After receiving information of the designated area returned by the decoding side, the coding side performs the second compression coding on the above-mentioned video image shown in FIG. 2. The second compression coding at least includes techniques such as inter-frame coding processing and intra-frame coding processing.

In the process of the above-mentioned second compression coding, the compression coding is performed to each frame image within the video image shown in FIG. 2 in turn.

When the compression coding is performed on one of the frame images, firstly, the time domain redundant information is removed from the frame image using the inter-frame coding processing method, and its specific process is described previously. Then, the spatial domain redundant information is removed from the frame image using the intra-frame coding processing method. The process of removing the spatial domain redundant information includes the transform coding and the quantization coding in turn. In the example of the present invention, the method for quantization coding is changed, and the quantization coefficient of each area in each frame image is redetermined. Here, areas in each frame image may be divided in accordance with the macro blocks of each frame image, and each macro block corresponds to an area. The quantization coefficient of the designated area within each frame image determined during the first compression coding is obtained and redetermined; and the redetermined quantization coefficient should be less than the quantization coefficient of the designated area in the first compression coding. Quantization coefficients of areas other than the designated area (hereafter referred as other areas) within each frame image, when the first compression coding was performed, are obtained and redetermined, and the redetermined quantization coefficients of other areas are greater than or equal to the quantization coefficients of other areas in the first compression coding. Here, the objective of increasing the quantization coefficients of other areas is to reduce the display qualities of images of other areas through increasing the compression ratios of other areas, so that the total data amount of an compression coded image is reduced.

Firstly, the spatial domain signals in the frame image are transformed into another orthogonal vector space using the transform coding, so that the transform coefficient of each area in the frame image is obtained. The transform coefficients are respectively quantized using the above-mentioned redetermined quantization coefficients. As the redetermined quantization coefficient of the interested area (i.e., the designated area), returned by the decoding side is less than the quantization coefficient of the first compression coding, the compression ratio of the data amount of the above-mentioned interested area is less than that of the first compression coding, so that more data of the interested area will be transmitted to the decoding side, and the display quality of the decoded image of the above-mentioned interested area is higher than that of the first compression coding.

Finally, the entropy coding is performed on the motion information obtained by the above-mentioned inter-frame coding processing and the quantized transform coefficients obtained by the above-mentioned intra-frame coding processing to obtain the data of the frame image after the second compression coding.

Step 14, the data after being processed with the second compression coding is transmitted to the decoding side, and a decoded video image is reobtained by the user.

Figure 4:
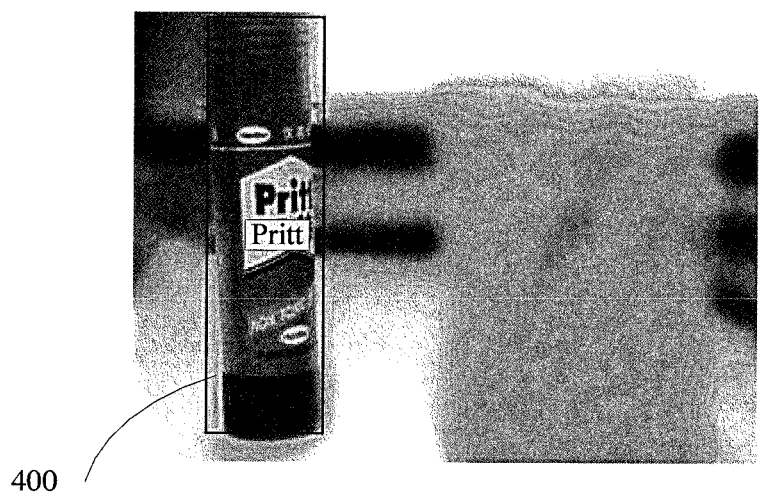
FIG. 4 is a schematic diagram illustrating a video image obtained by a decoding side after a video image shown in FIG. 2 is coded for the second time according to the first example of the present invention.

Here, the data of each frame image in the video image shown in FIG. 2, which was processed with the second compression coding, is combined and transmitted to the decoding side; the decoding side decodes the received data, and transmits the decoded data to the video display module for displaying, and then a video image shown in FIG. 4 is obtained. It can be seen from the FIG. 4 that, the display quality of the interested area 400 which is surrounded by a box and accompanied with words of "Pritt" is significantly better than that of other areas.

A Second Example

Figure 5:
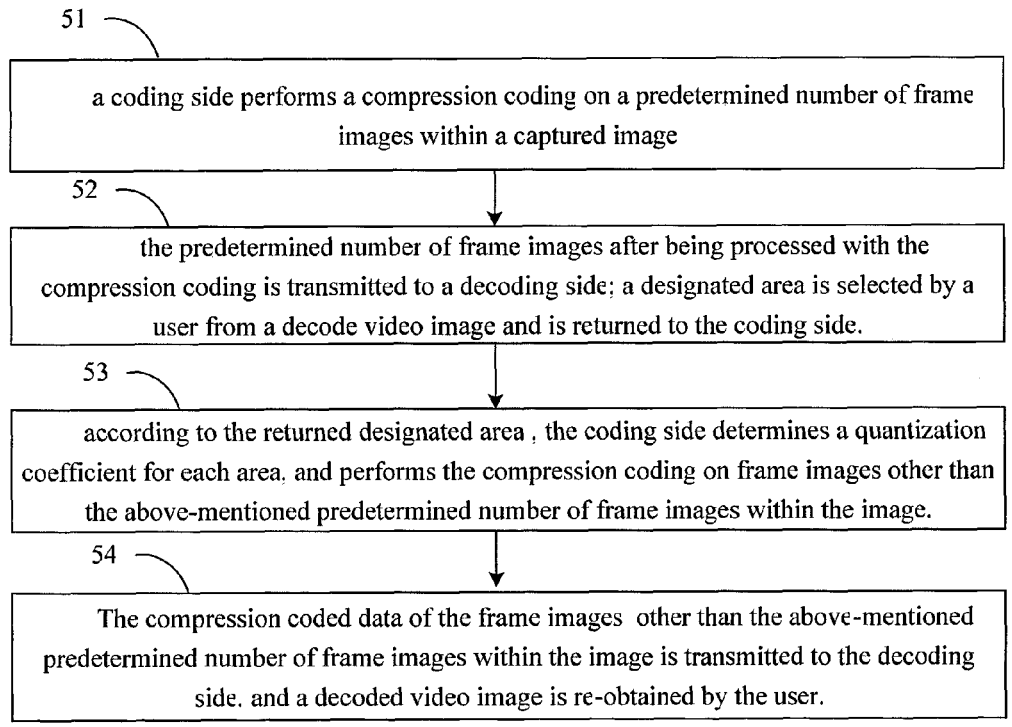
FIG. 5 is a schematic diagram illustrating a video image obtained by a decoding side after a video image shown in FIG. 2 is coded according to a coding method provided by a second example of the present invention.

A process of a method for image compression coding is shown in FIG. 5, which includes the following steps.

Step 51, a coding side performs a compression coding on a predetermined number of frame images within a captured image.

The coding side captures an image to be transmitted, determines a quantization coefficient for each area in each frame image within the image. Here, areas of each frame image may be divided in accordance with macro blocks of each frame, where each macro block corresponds to an area. According to the above-mentioned quantization coefficients, the compression coding is performed to each frame in the predetermined number of frame images within the above mentioned image, so that the compression coded data of the predetermined number of frame images is obtained. For example, the compression coded data of the previous 100 frame images is obtained. This compression coding at least includes techniques such as inter-frame coding processing and intra-frame coding processing.

The coding side needs to save the motion information of each frame image when the compression coding is performed, and to save the quantization coefficient of each area in each frame image.

Step 52, the predetermined number of frame images after being processed with the compression coding is transmitted to a decoding side; a designated area is selected by a user from a video image obtained after being decoded by the decoding side and is returned to the coding side.

In the process of coding, according to an order of serial numbers of frame images, the coding side transmits the obtained compression coded data of each frame image to the decoding side in real time. The decoding side decodes the received compression coded data of each frame image, and transmits the decoded data of each frame image to a video display module for displaying.

A user selects a designated area from the decoded video image through the video display module, and returns the selected designated area to the coding side.

For example, after decoding and displaying the compression coded data of the 100th frame, the decoding side selects a rectangular area identified by points (0, 0) and (32, 32) as the designated area.

Step 53, according to the designated area returned by the decoding side, the coding side determines a quantization coefficient for each area in each frame image within the image, and performs the compression coding on frame images other than the above-mentioned predetermined number of frame images within the image.

In this step, the method for determining the quantization coefficient for each area in each frame image includes the following steps.

1. After receiving information of the designated area returned by the decoding side, according to the motion information previously saved for each frame image, the coding side firstly needs to find an area, corresponding to the designated area, within the current frame image to be coded. During the process of finding, the position information of each frame between the frame corresponding to the designated area and the current frame to be coded will be utilized in turn.

Take selecting the designated area in the 100th frame as an example. According to the motion information of the 100th frame and the 101st frame, it is found that the position of the rectangular area identified by the points (0, 0) and (32, 32) in the 100th frame is a rectangular area identified by points (32, 32) and (64, 64) in the 101st frame; then, according to the motion information of the 102nd frame, it is found that the current position of the rectangular area identified by the points (32, 32) and (64, 64) in the 101st frame is a rectangular area identified by points (96, 96) and (128, 128) in the 102nd frame; therefore, it is determined that the area corresponding to the above-mentioned designated area in the current 102nd frame to be coded is the rectangular area identified by the points (96, 96) and (128, 128) within the current 102nd frame.

2. According to the quantization coefficient previously saved for each area in each frame image, the coding side obtains the quantization coefficient of the above-mentioned designated area within the frame (such as the 100th frame) corresponding to the designated area, and then redetermines the quantization coefficient. The redetermined quantization coefficient is less than the saved quantization coefficient of the designated area within the corresponding frame of the designated area.

3. According to the saved quantization coefficient of each area in each frame image, for areas other than the above-mentioned designated area (hereafter referred as other areas) in the current frame image to be coded, the coding side obtains the quantization coefficients of these areas within the frame corresponding to the designated area, then redetermines the quantization coefficients of the above-mentioned other areas in the current frame image to be coded, and the redetermined quantization coefficients are greater than or equal to the quantization coefficients of other areas in the frame corresponding to the designated area. Here, the objective of increasing the quantization coefficients of areas other than the designated area is to reduce the display qualities of images of the areas other than the designated area through increasing the compression ratios of the areas other than the designated area, so that the total data amount of the compression coded image is reduced.

According to the method of determining quantization coefficient for the current frame, the quantization coefficients of other remaining frames within the image are determined in turn, for example: it is assumed that the current frame is the 102nd frame, and then the quantization coefficients of frames beginning from the 103rd frame are determined in turn.

Afterwards, according to the above-mentioned redetermined quantization coefficient of each frame, the compression coding is performed in turn on each frame image in the remaining frame images (e.g., the frame images starting from the 102nd frame), which are frame images other than the predetermined number of frame images within the image. Here, when the compression coding is performed on a frame image, first of all, the time domain redundant information is removed from the frame image using the inter-frame coding processing method.

Firstly, the spatial domain signals in the frame image are transformed into another orthogonal vector space using the transform coding, so that the transform coefficient of each area in the frame image is obtained. The transform coefficients are respectively quantized using the above-mentioned redetermined quantization coefficients. Here, as the redetermined quantization coefficient of the area corresponding to the designated area which is returned by the decoding side is less than the quantization coefficient of the last compression coding, the compression ratio of the data amount of the area corresponding to the designated area is less than that of the last compression coding, so that the data of the area corresponding to the designated area will be transmitted to the decoding side more and more, therefore the display quality of the decoded image of the area corresponding to the designated area is higher than the display quality of the previously compression coded image.

Finally, the entropy coding is performed on the motion information obtained by the above-mentioned inter-frame coding processing and the quantized transform coefficients obtained by the above-mentioned intra-frame coding processing, so that the compression coded data of other remaining frame images are obtained.

Step 54, the above-mentioned compression coded data of other remaining frame images is transmitted to the decoding side, and a decoded video image is re-obtained by the user.

According to the order of the serial numbers of frame images, the above-mentioned compression coded data of other remaining frame images is transmitted to the decoding side in turn; the decoding side decodes the received data, and transmits the decoded data to the video display module for displaying.

A Third Example

Figure 6:
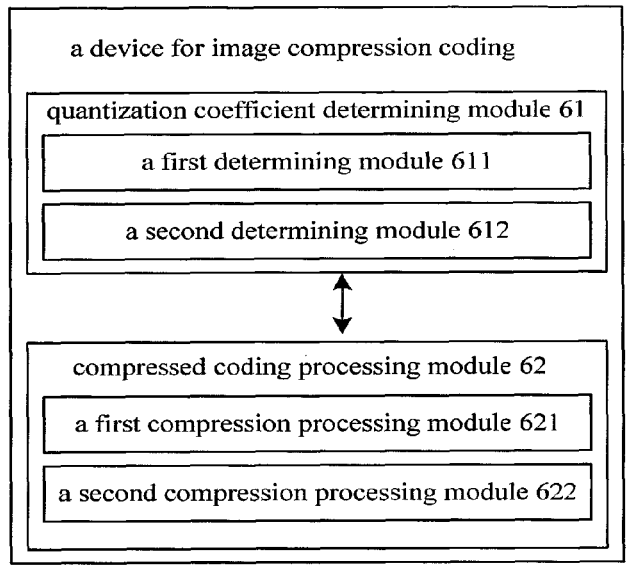
FIG. 6 is a schematic diagram illustrating structure of a device for image compression coding provided by an example of the present invention.

The example of the present invention also provides a device for image compression coding, whose specific structure is shown in FIG. 6, including the following modules.

A quantization coefficient determining module 61, which is adapted to obtain a designated area selected by a decoding side from an image, and determine a quantization coefficient for each area in each frame image within the image according to the designated area. Here, areas in each frame image may be divided in accordance with macro blocks of each frame, where each macro block represents an area.

A compression coding processing module 62, which is adapted to perform the compression coding on the image according to the quantization coefficient of each area in each frame image within the image, where the quantization coefficient is determined by the quantization coefficient determining module 61; and to transmit the compression coded image to the decoding side.

In an example of the present invention, the above-mentioned quantization coefficient determining module 61 includes:

A first determining module 611, which is adapted to perform a first compression coding on the image, transmit the image after being processed with the first compression coding to the decoding side, and obtain the designated area selected by the decoding side from the image which is decoded by the decoding side. Here, the above-mentioned first compression coding at least includes techniques such as inter-frame coding processing and intra-frame coding processing.

The above-mentioned first determining module 611 is further adapted to obtain a quantization coefficient of the designated area in each frame image within the image when the first compression coding is performed, and redetermine the quantization coefficient of the designated area in each frame image. Here, the redetermined quantization coefficient is less than the quantization coefficient of the designated area in the first compression coding.

The above-mentioned first determining module 611 is further adapted to obtain quantization coefficients of other areas, which are areas in each frame image other than the designated area, in the first compression coding, and redetermine the quantization coefficients of these other areas in each frame image. Here, the redetermined quantization coefficients of other areas are greater than or equal to the quantization coefficients of these other areas in the first compression coding.

In an example of the present invention, the above-mentioned compression coding processing module 62 includes:

a first compression processing module 621, which is adapted to obtain motion information and a transform coefficient of each area in a frame image within the image; quantize the transform coefficient of the designated area in the frame image using the redetermined quantization coefficient of the designated area; quantize the transform coefficients of other areas in the frame image using the redetermined quantization coefficients of other areas which are areas in the frame image other than the designated area.

The above-mentioned first compression processing module 621 is further adapted to compress the motion information and the quantized transform coefficient of each area in the frame image, and then obtain the data, after being processed with the second compression coding, of the frame image.

The above-mentioned first compression processing module 621 is further adapted to obtain the data processed with the second compression coding of each frame image within the image one by one, to obtain the data of the image after being processed with the second compression coding, and then transmit the data of the image after being processed with the second compression coding to the decoding side.

In an example of the present invention, the above-mentioned quantization coefficient determining module 61 includes:

a second determining module 612, which is adapted to perform the compression coding to the predetermined number of frame images in an image; save motion information of each frame image within the predetermined number of frame images and a quantization coefficient of each area in each frame image within the predetermined number of frame images; transmit the predetermined number of frame images, after being processed with the compression coding, to a decoding side in turn according to an order of serial numbers of frame images; and obtain a designated area selected by the decoding side from a certain frame image decoded by the decoding side.

The above-mentioned second determining module 612 is further adapted to obtain an area, corresponding to the designated area in a certain frame image, within the current frame image to be coded according to the saved motion information of each frame image; redetermine the quantization coefficient of the area, corresponding to the designated area, within the current frame image to be coded. Here, the redetermined quantization coefficient is less than the quantization coefficient of the designated area in the certain frame image.

The above-mentioned second determining module 612 is further adapted to obtain areas, corresponding to the areas in the certain frame image other than the designated area, in the current frame image to be coded according to the saved motion information of each frame image; redetermine the quantization coefficients of these other areas in the current frame image to be coded. Here, the redetermined quantization coefficients are greater than or equal to the quantization coefficients of other areas which are areas in the certain frame image other than the designated area.

The above-mentioned second determining module 612 is further adapted to redetermine the quantization coefficients of frame images within the image other than the predetermined number of frame images according to the method for determining the quantization coefficient for the current frame image to be coded.

In an example of the present invention, the above-mentioned compression coding processing module 62 includes:

a second compression processing module 622, which is adapted to obtain motion information and a transform coefficient of each area in a current frame image to be coded; quantize the transform coefficient of the area, corresponding to the designated area, in the current frame image to be coded using the redetermined quantization coefficient of the area corresponding to the designated area; quantize the transform coefficients of other areas in the current frame image to be coded other than the designated area using the redetermined quantization coefficients of other areas in the current frame image to be coded; compress the motion information and the quantized transform coefficient of each area in the current frame image to be coded to obtain the compression coded data of the current frame image to be coded.

The above-mentioned second compression processing module 622 is further adapted to obtain the compression coded data of other frame images within the image one by one according to the above-mentioned method for performing the compression coding on the current frame image to be coded; and transmit the compression coded data of other frame images to the decoding side in turn according to the order of serial numbers of frame images.

Those skilled in the art may understand that all or part of the processes of the methods of the above examples may be implemented by hardware modules following instructions of a computer program. The computer program may be stored in a computer readable storage medium. When running, the computer program may provide the processes of the examples of the above methods. The storage medium may be diskette, CD, ROM (Read-Only Memory) or RAM (Random Access Memory), and etc.

In view of the above, in a video communication system, the present invention may support a user to select an interested area (i.e., the aforementioned designated area) from video image data, and clearly transmit the interested area selected by the user, so that requirements of users for focusing on a certain detail within an image will be fulfilled.

In examples of the present invention, as the quantization coefficients of areas which a user is not interested in may be set lower, the compression ratios of these areas are increased, so that the total amount of data transmission is not increased in the examples of the present invention.

The above are just preferable examples of the present invention, and are not for limiting the protection scope of the present invention. Any modifications, equivalents, improvements, etc., made under the principle of the present invention, are all included in the protection scope of the present invention.

What is claimed is:

1. A method for image compression coding, comprising:
    obtaining a designated area selected from an image at a decoding side;
    determining quantization coefficients of the image to make an image compression ratio of the designated area lower than image compression ratios of areas in the image other than the designated area; and
    performing a compression coding on the image using the determined quantization coefficients of the image.

2. The method of claim 1, wherein the obtaining the designated area selected from the image at the decoding side comprises:
    performing a first compression coding on the image;
    transmitting the image after being coded with the first compression coding to the decoding side; and
    obtaining the designated area selected from a decoded image at the decoding side.

3. The method of claim 2, wherein the determining the quantization coefficients of the image comprises:
    obtaining, from the first compression coding, a first quantization coefficient of the designated area in each frame of the image;
    determining a second quantization coefficient of the designated area in each frame, wherein the second quantization coefficient of the designated area is less than the first quantization coefficient of the designated area;
    obtaining, from the first compression coding, first quantization coefficients of areas within each frame other than the designated area during the performing of the first compression coding; and
    determining second quantization coefficients of the areas in each frame other than the designated area, wherein the second quantization coefficients of the areas other than the designated area are greater than or equal to the first quantization coefficients of the areas other than the designated area.

4. The method of claim 3, wherein the performing the compression coding to the image using the determined quantization coefficients of the image comprises:
    performing a second compression coding on each frame of the image using the second quantization coefficient of the designated area in each frame and the second quantization coefficients of areas within each frame other than the designated area,
    wherein the performing the second compression coding on each frame comprises:
    obtaining motion information and transform coefficients of a frame;
    quantizing a transform coefficient of the designated area within the frame using the second quantization coefficient of the designated area;
    quantizing transform coefficients of the areas other than the designated area within the frame using the second quantization coefficients of the areas; and,
    compressing the motion information and quantized transform coefficients of the frame.

5. The method of claim 1, wherein the obtaining the designated area selected from the image at the decoding side comprises:
    performing the compression coding on a predetermined number of frames within the image;
    saving motion information and quantization coefficients of the predetermined number of frames;
    transmitting the predetermined number of frames after being coded to the decoding side,
    obtaining the designated area selected from a frame at the decoding side where the frame is decoded; and
    wherein the determining the quantization coefficients of the image comprises:
    before performing the compression coding on frames other than the predetermined number of frames within the image, determining the quantization coefficients of the frames.

6. The method of claim 5, wherein the determining the quantization coefficients of the frames comprises:
    according to the saved motion information of the predetermined number of frames, determining a corresponding area of the designated area within a current frame to be coded;
    determining a second quantization coefficient of the determined corresponding area, wherein the second quantization coefficient of the corresponding area is less than a first quantization coefficient of the designated area in the frame;
    according to the saved motion information of the predetermined number of frames, determining areas, corresponding to areas other than the designated area within the current frame to be coded; and
    determining second quantization coefficients of the determined corresponding areas, wherein the second quantization coefficients of the corresponding areas are greater than or equal to first quantization coefficients of the areas in the frame other than the designated area.

7. The method of claim 6, wherein the performing the compression coding on the image using the determined quantization coefficients of the image comprises:
performing the compression coding on the frames other than the predetermined number of frames within the image using the second quantization coefficient of the determined corresponding area of the designated area and the second quantization coefficients of the determined areas corresponding to areas other than the designated area, wherein the performing the compression coding on the frames other than the predetermined number of frames within the image comprises:
obtaining motion information and transform coefficients of the current frame to be coded;
quantizing a transform coefficient of the determined corresponding area of the designated area within the current frame to be coded using the second quantization coefficient of the corresponding area of the designated area;
quantizing transform coefficients of the determined areas corresponding to areas other than the designated area within the current frame to be coded using the second quantization coefficients of the corresponding areas of the areas in the frame other than the designated area; and
compressing the motion information and quantized transform coefficients of the current frame to be coded.

8. A device for image compression coding, comprising:
a quantization coefficient determining module, to obtain a designated area selected from an image at a decoding side,
determine quantization coefficients of the image to make an image compression ratio of the designated area lower than image compression ratios of areas in the image other than the designated area; and
a compression coding processing module, to perform a compression coding on the image using the determined quantization coefficients of the image.

9. The device of claim 8, wherein the quantization coefficient determining module comprises:
a first determining module, to perform a first compression coding on the image;
transmit the image after being coded with the first compression coding to the decoding side;
obtain the designated area selected from a decoded image at the decoding side;
obtain, from the first compression coding, a first quantization coefficient of the designated area in each frame of the image;
determine a second quantization coefficient of the designated area in each frame, wherein the second quantization coefficient of the designated area is less than the first quantization coefficient of the designated area;
obtain, from the first compression coding, first quantization coefficients of areas within each frame other than the designated area; and
determine second quantization coefficients of the areas in each frame other than the designated area, wherein the second quantization coefficients of the areas other than the designated area are greater than or equal to the first quantization coefficients of the areas other than the designated area.

10. The device of claim 9, wherein the compression coding processing module comprises:
a first compression processing module, to perform a second compression coding on each frame of the image using the second quantization coefficient of the designated area in each frame and the second quantization coefficients of areas within each frame other than the designated area,
wherein to perform the second compression coding on each frame comprises:
the first compression processing module is to obtain motion information and transform coefficients of a frame,
quantize a transform coefficient of the designated area within the frame using the second quantization coefficient of the designated area,
quantize transform coefficients of the areas other than the designated area within the frame using the second quantization coefficients of other areas, and
compress the motion information and quantized transform coefficients of the frame.

11. The device of claim 8, wherein the quantization coefficient determining module comprises:
a second determining module, to perform the compression coding on a predetermined number of frames within the image,
save motion information and quantization coefficients of the predetermined number of frames,
transmit the predetermined number of frames after being coded to the decoding side,
obtain the designated area selected from a frame at the decoding side where the frame is decoded, and
before performing the compression coding on frames other than the predetermined number of frames within the image, the second determining module is to determine the quantization coefficients of the frames,
wherein the second determining module is to determine the quantization coefficients of a current frame to be coded comprises:
according to the saved motion information of the predetermined number of frames, the second determining module is to determine a corresponding area of the designated area within the current frame to be coded, and
determine a second quantization coefficient of the determined corresponding area, wherein the second quantization coefficient of the corresponding area is less than a first quantization coefficient of the designated area in the frame,
according to the saved motion information of the predetermined number of frames, the second determining module is to determine areas, corresponding to areas other than the designated area within the current frame to be coded, and
determine second quantization coefficients of the determined corresponding areas, wherein the second quantization coefficients of the corresponding areas are greater than or equal to first quantization coefficients of the areas in the frame other than the designated area.

12. The device of claim 11, wherein the compression coding processing module comprises:
a second compression processing module, to perform the compression coding on the frames other than the predetermined number of frames within the image using the second quantization coefficient of the determined corresponding area of the designated area and the second quantization coefficients of the determined areas corresponding to areas other than the designated area, which comprises:
the second compression processing module is to obtain motion information and transform coefficients of the current frame to be coded;

quantize a transform coefficient of the determined corresponding area of the designated area within the current frame to be coded using the second quantization coefficient of the corresponding area of the designated area;

quantize transform coefficients of the determined areas corresponding to areas other than the designated area within the current frame to be coded using the second quantization coefficients of the corresponding areas of the areas in the frame other than the designated area; and compress the motion information and quantized transform coefficients of the current frame to be coded.

13. A non-transitory computer readable storage medium storing one or more programs, the one or more programs comprising instructions that when executed by one or more computers cause the one or more computers to perform operations comprising:

obtaining a designated area selected from an image at a decoding side;

determining quantization coefficients of the image to make an image compression ratio of the designated area lower than image compression ratios of areas in the image other than the designated area; and performing a compression coding on the image using the determined quantization coefficients of the image.

14. The computer readable storage medium of claim 13, wherein the obtaining the designated area selected from the image at the decoding side comprises:

performing a first compression coding on the image; transmitting the image after being coded with the first compression coding to the decoding side; and obtaining the designated area selected from a decoded image at the decoding side.

15. The computer readable storage medium of claim 14, wherein the determining the quantization coefficients of the image comprises:

obtaining, from the first compression coding, a first quantization coefficient of the designated area in each frame of the image;

determining a second quantization coefficient of the designated area in each frame, wherein the second quantization coefficient of the designated area is less than the first quantization coefficient of the designated area;

obtaining, from the first compression coding, first quantization coefficients of areas within each frame other than the designated area during the performing of the first compression coding; and determining second quantization coefficients of the areas in each frame other than the designated area, wherein the second quantization coefficients of the areas other than the designated area are greater than or equal to the first quantization coefficients of the areas other than the designated area.

16. The computer readable storage medium of claim 15, wherein the performing the compression coding to the image using the determined quantization coefficients of the image comprises:

performing a second compression coding on each frame of the image using the second quantization coefficient of the designated area in each frame and the second quantization coefficients of areas within each frame other than the designated area, wherein the performing the second compression coding on each frame comprises:

obtaining motion information and transform coefficients of a frame;

quantizing a transform coefficient of the designated area within the frame using the second quantization coefficient of the designated area;

quantizing transform coefficients of the areas other than the designated area within the frame using the second quantization coefficients of the areas; and compressing the motion information and quantized transform coefficients of the frame.

17. The computer readable storage medium of claim 13, wherein the obtaining the designated area selected from the image at the decoding side comprises:

performing the compression coding on a predetermined number of frames within the image;

saving motion information and quantization coefficients of the predetermined number of frames;

transmitting the predetermined number of frames after being coded to the decoding side, obtaining the designated area selected from a frame at the decoding side where the frame is decoded; and wherein the determining the quantization coefficients of the image comprises:

before performing the compression coding on frames other than the predetermined number of frames within the image, determining the quantization coefficients of the frames.

18. The computer readable storage medium of claim 17, wherein the determining the quantization coefficients of the frames comprises:

according to the saved motion information of the predetermined number of frames, determining a corresponding area of the designated area within a current frame to be coded;

determining a second quantization coefficient of the determined corresponding area, wherein the second quantization coefficient of the corresponding area is less than a first quantization coefficient of the designated area in the frame;

according to the saved motion information of the predetermined number of frames, determining areas, corresponding to areas other than the designated area within the current frame to be coded; and determining second quantization coefficients of the determined corresponding areas, wherein the second quantization coefficients of the corresponding areas are greater than or equal to first quantization coefficients of the areas in the frame other than the designated area.

19. The computer readable storage medium of claim 18, wherein the performing the compression coding on the image using the determined quantization coefficients of the image comprises:

performing the compression coding on the frames other than the predetermined number of frames within the image using the second quantization coefficient of the determined corresponding area of the designated area and the second quantization coefficients of the determined areas corresponding to areas other than the designated area, wherein the performing the compression coding on the frames other than the predetermined number of frames within the image comprises:

obtaining motion information and transform coefficients of the current frame to be coded;

quantizing a transform coefficient of the determined corresponding area of the designated area within the current frame to be coded using the second quantization coefficient of the corresponding area of the designated area;

quantizing transform coefficients of the determined areas corresponding to areas other than the designated area within the current frame to be coded using the second quantization coefficients of the corresponding areas of the areas in the frame other than the designated area; and compressing the motion information and quantized transform coefficients of the current frame to be coded.

* * * * *